United States Patent [19]

Graf zu Münster

[11] 4,338,134

[45] Jul. 6, 1982

[54] PROCESS FOR BINDING WASTE LIQUOR OR SLUDGE

[75] Inventor: Ludbert Graf zu Münster, Munich, Fed. Rep. of Germany

[73] Assignee: Handelskontor Ludbert Graf zu Munster GmbH & Co., Munich, Fed. Rep. of Germany

[21] Appl. No.: 172,547

[22] Filed: Jul. 28, 1980

[30] Foreign Application Priority Data

Jul. 27, 1979 [DE] Fed. Rep. of Germany ....... 2930602

[51] Int. Cl.³ .......................... B09B 1/00; G21F 9/00; C04B 11/00; C04B 7/34
[52] U.S. Cl. ....................................... 106/85; 106/97; 106/109; 106/118; 106/900; 405/128
[58] Field of Search .................. 106/85, 97, 109, 110, 106/117, 118, 900; 405/128, 129

[56] References Cited

U.S. PATENT DOCUMENTS

| | | | |
|---|---|---|---|
| 3,852,084 | 12/1974 | Webster | 106/900 |
| 4,015,997 | 4/1977 | Selmeczi et al. | 106/117 |
| 4,016,240 | 4/1977 | Hinsche et al. | 106/109 |
| 4,118,243 | 10/1978 | Sandesara | 106/109 |
| 4,132,558 | 1/1979 | Uchikawa et al. | 106/85 |
| 4,208,217 | 6/1980 | Anderson et al. | 106/103 |

FOREIGN PATENT DOCUMENTS

| | | | |
|---|---|---|---|
| 2827912 | 4/1979 | Fed. Rep. of Germany | 106/98 |
| 54-132473 | 10/1979 | Japan | 405/128 |
| 1170861 | 11/1969 | United Kingdom | 106/85 |
| 1354562 | 5/1974 | United Kingdom | 106/85 |

*Primary Examiner*—Gary P. Straub
*Attorney, Agent, or Firm*—Hammond & Littell, Weissenberger and Muserlian

[57] ABSTRACT

An improved process for binding waste liquor or sludge comprising adding a hydraulic mortar to waste liquor or sludge to form a mixture and allowing the mixture to set, the improvement consisting of subjecting the mixture of hydraulic mortar and waste liquor or sludge to a milling operation before the mixture is allowed to set.

12 Claims, No Drawings

PROCESS FOR BINDING WASTE LIQUOR OR SLUDGE

Industrial manufacturing processes are frequently distinguished by the discharge of substances which are harmful to the environment, these often being heavy metals. Numerous technical processes have been developed for concentrating these substances in sludges. As a result, however, the problem of disposing of the sludge presents itself. For this purpose, numerous hardening processes applied in the construction industry have been proposed. Thus, for example, U.S. Pat. Nos. 3,837,872 and 3,893,656 describe the use of Portland cement and sodium silicate as reaction accelerators. FR-PS 2,320,266 describes less expensive binders which are based on blast furnace slag and flue dust as admixed substances. The products obtained have, however, remained unsatisfactory with regard to their mechanical properties.

According to the invention, a process is proposed for binding waste liquor or sludge, in which a hydraulic mortar is added to waste liquor or sludge and the mixture is allowed to set, the process being characterised in that the mixture consisting of waste liquor or sludge and hydraulic mortar is subjected to a milling operation and then allowed to set.

As a result of this procedure, better mechanical properties of the set products can be obtained. Surprisingly, good setting rates and good mechanical properties can be achieved even when the operation is carried out in the presence of inhibitors, for example zinc or phosphorus compounds.

Since a milling process is provided, the process according to the invention offers the additional advantage that coarse-grained hydraulic mortar or coarse-grained hydraulic mortar constituents can be used, for example granulated blast furnace slag.

Sludge having a solids content of up to 60, preferably from 10 to 50 and especially from 15 to 40, % by weight can be used.

The weight ratio of hydraulic mortar:sludge solids may be from 30:1 to 0.5:1, preferably from 10:1 to 1:1 and especially from 5:1 to 2:1. These values, however, are intended merely as a guide for the man skilled in the art. It is, of course, expected that the man skilled in the art will determine the suitable ratio of hydraulic mortar:waste liquor or sludge by simple tests.

In the milling operation, the specific surface area of the solids, especially of high-alumina material or cement in or as the hydraulic mortar, can be increased by 50%, preferably 90% and especially 150% and more.

Alternatively a satisfactory result can be achieved by carrying out the milling process in such a manner that, of a sieve fraction having at least 10, preferably 20 and especially 50, % by weight of solid particles, especially of particles of the high-alumina material and/or cement, at least 10, preferably 20 and especially 50, % by weight and more pass through the sieve after the milling operation.

The choice of a suitable mill can be left to the man skilled in the art. Ball type mills are suitable.

The process according to the invention can be carried out using any type of hydraulic mortar; the disclosure of U.S. Pat. Nos. 3,720,609 and 3,785,840 is included.

Thus, for example, it is possible to use a hydraulic mortar consisting of:

(1a) lime-rich material,
(1b) naturally or synthetically burnt clay-rich material and/or
(2) cement and, in addition to (1a) or (1b) and/or (2),
(3) optionally, from 0.5 to 20% by weight of gypsum or anhydrite, based on the weight of the hydraulic mortar,
(4) optionally, from 0.5 to 10% by weight of an activator, based on the weight of the hydraulic mortar and
(5) optionally, from 0.5 to 20% by weight of a polymerisable resin or resin mixture, based on the weight of the hydraulic mortar.

The optimum ratio of clay-rich material:lime-rich material is determined by tests. In general, a weight ratio of clay-rich material:lime-rich material such as from 2:1 to 4:1, especially from 2:1 to 9:1, is advantageous.

The hydraulic mortar may consist, for example, of:

10 to 25 parts by weight of lime,
30 to 70 parts by weight of a burnt clay-rich material, such as, for example, pozzuolana,
2 to 8 parts by weight of gypsum,
1 to 10 parts by weight of activator, for example sodium aluminate or sodium silicate, and
1 to 10 parts by weight of a polymerisable resin.

As lime-rich material, burnt lime, hydraulic lime, magnesium lime, dolomite or lime-rich fly ash (from, for example, a combustion of brown coal or garbage) can be used.

As clay-rich material, natural or synthetic pozzuolanas, tuffs, trasses, flue dust, burnt clays, burnt shales or bituminous shales, burnt sediment, burnt bauxite, red sludge (from an aluminium production) or naturally or synthetically burnt aluminium silicates or alkali metal aluminium silicates can be used.

Clay-rich materials may possess different activities towards lime-rich materials. The suitability of clay-rich materials can, however, be easily determined by a test. For this purpose, one part by weight of burnt lime is mixed with 4 parts by weight of a milled clay-rich material while mixing in the necessary amount of water until a paste of good consistency is obtained (generally, with 2 parts by weight of water). When the mixture has set after a predetermined time, the compression resistance is determined.

Natural pozzuolanas are mainly volcanic ashes having a composition corresponding to that of clays. For example, they may have the following composition (% by weight):

| Ignition loss | $SiO_2$ | $Al_2O_3$ | $Fe_2O_3$ | $TiO_2$ | CaO | MgO | $Na_2O$ | $K_2O$ | $SO_3$ |
|---|---|---|---|---|---|---|---|---|---|
| 10 | 55 | 17 | 5 | 0.5 | 5 | 2 | 2.5 | 2.5 | 0.5 |

They are generally distinguished by a high silicon content. Important deposits are: Rhine trass, pozzuolanas from Naples-Bacoli, tuffs of the Crimea and pumices.

Raw clay and raw sediment may also be active towards lime.

If necessary, an activator may be added. Any substances that liberate sodium hydroxide are suitable, for example sodium aluminate, sodium silicate or water glass, sodium carbonate and/or caustic soda. They are used in amounts of less than 10% by weight, based on the weight of the hydraulic mortar.

Lactates, such as calcium lactate and iron lactate, and ammonium nitrate have also been found to be good activators, especially in the case of hydraulic mortars consisting of the above-mentioned constituents (1a) to (1b) and (3) to (5).

As polymerisable resin, a urea/formaldehyde resin or a melamine/formaldehyde resin or an acrylic resin may be used.

As examples of cements there may be mentioned: Portland cement, iron Portland cement, Roman cement and supersulphated cement.

The compositions that can be obtained according to the process of the invention can be used for the manufacture of water-proof courses, dams, building blocks and for back-filling in mines.

The invention is described in detail below by means of Examples, all information regarding amounts being expressed on a weight basis unless otherwise stated.

EXAMPLE 1

The waste came from a surface treatment plant. Its properties were as follows: content of dry substance 35%, pH 7.

Composition of the dry substance:

| | | |
|---|---|---|
| Chromium | 15% |
| Copper | 8% |
| Zinc | 2% |
| Aluminium | 10% |
| Iron | 2% |
| Nickel | 0.5% |
| Mercury | 50 ppm |
| Lead | 10 ppm |
| Cadmium | 20 ppm |

A first processing operation was carried out using 70 parts of burnt clay and 20 parts of lime to 100 parts of sludge.

The compression resistance measured in samples measuring 4×4×16 cm was as follows:

| | |
|---|---|
| 7 days: | 1 MPa |
| 1 month: | 8.5 MPa |
| 6 months: | 15 MPa |

The fixing of the poisonous elements was assessed after 7 days in the usual manner by comminuting the sample to a particle size of approximately 1 mm and combining it with 10 times its weight of water. The mixture was left to stand for 3 days at a temperature of 20° C. After stirring vigorously, the solid parts settled; the substance floating on the surface was analysed. The results, expressed on a weight basis, were compared with those obtained with the raw sludge. They are as follows (parts per million):

| | raw sludge | processed sludge |
|---|---|---|
| Al | 10 | 0.08 |
| Zn | 2 | <0.05 |
| Ni | 0.1 | 0.01 |
| Pb | 3 | 0.06 |
| Cu | 0.7 | 0.05 |

| | raw sludge | processed sludge |
|---|---|---|
| Cr | 5 | 0.04 |

It can be gathered from this that fixing is excellent. Considering the excellent mechanical performance of the material, which can only improve with time, it is impossible for water to penetrate into the innermost region of the material.

EXAMPLE 2

The effect of various additives was assessed according to the mechanical compressive strengths measured in MPa.

| Binder | 7 days | 1 month | 6 months |
|---|---|---|---|
| pozzuolana + lime (70:20 parts) | 1 | 8.5 | 15 |
| addition of 4 parts of calcium sulphate | 1.5 | 10 | 16.5 |
| addition of 5 parts of sodium aluminate | 1.8 | 9 | 14 |
| addition of 4 parts of urea/formaldehyde resin | 2.5 | 11 | 13 |

The effect of the various additives is a distinct acceleration of hardening. It is also possible to accumulate the various additives. The results are then as follows:

| 7 days | 1 month | 6 months |
|---|---|---|
| 5.5 | 25 | 35 |

EXAMPLE 3

To a mixture of 1 part lime and 3 parts flue dust were added 2 parts of water containing 2% of NaOH. A second mixing was then carried out, under the same conditions, with 5% of ZnO, based on the solids, being added. A third and fourth mixing were carried out, under the same conditions as in the case of the first and second mixture, the constituents being introduced into a ball type mill, however, in which they were subjected to comminution at 30 J/g for 0.5 hour. The specific surface area of the dust was originally 1500 cm²/g. After comminution it amounted to 3200 cm²/g. A fifth mixture was prepared under the same conditions as the third mixture, zinc oxide being added after comminution, however, in the same proportions as in mixtures 2 and 4.

The compression resistance in MPa of fused samples measuring 4×4×16 cm of these different mixtures are given below:

| Mixture | 7 days | 28 days | 180 days |
|---|---|---|---|
| flue dust + lime | 2 | 4 | 17 |
| flue dust + lime + ZnO | 0.5 | 2 | 5 |
| flue dust + lime + comminution for 0.5 hour | 3 | 15 | 30 |
| flue dust + lime + ZnO + comminution for 0.5 hour | 2.5 | 12 | 25 |
| flue dust + lime + comminution + ZnO | 0.5 | 2.5 | 4.5 |

The tests show that, according to the invention, the inhibiting action of ZnO can be more than compensated.

I claim:

1. In the process for binding waste liquor or sludge comprising forming a mixture of hydraulic mortar and waste liquor or sludge in the presence of inhibiting zinc or phosphorus compounds and allowing said mixture to set, the improvement consisting of subjecting said mixture of hydraulic mortar and waste liquor or sludge to a milling operation before said mixture is allowed to set.

2. In the process for binding sludge comprising forming a mixture of hydraulic mortar and sludge in the presence of inhibiting zinc or phosphorus compounds and allowing said mixture to set, the improvement consisting of utilizing a weight ratio of hydraulic mortar to sludge solids of from 30:1 to 0.5:1, the sludge having a solids content of up to 60% by weight with the remainder water, and subjecting said mixture of hydraulic mortar and sludge to a milling operation to increase the specific surface area of the solids, especially of the hydraulic mortar, by 50% and more and that more solid particles especially of the hydraulic mortar pass through a particular sieve size after said milling, than before said milling, before said mixture is allowed to set.

3. In the process for binding sludge comprising forming a mixture of hydraulic mortar and sludge in the presence of zinc oxide and allowing said mixture to set, the improvement consisting of utilizing a weight ratio of hydraulic mortar to sludge solids of from 30:1 to 0.5:1, the sludge having a solids content of up to 60% by weight with the remainder water, and subjecting said mixture of hydraulic mortar and sludge to a milling operation to increase the specific surface area of the solids, especially of the hydraulic mortar, by 50% and more and that more solid particles especially of the hydraulic mortar pass through a particular sieve size after said milling than before said milling, before said mixture is allowed to set.

4. In the process for binding waste liquor or sludge comprising forming a mixture of hydraulic mortar and waste liquor or sludge in the presence of zinc oxide and allowing said mixture to set, the improvement consisting of subjecting said mixture of hydraulic mortar and waste liquor or sludge to a milling operation before said mixture is allowed to set.

5. Process according to claim 4, characterized in that sludge having a solids content of up to 60% by weight, with the remainder water, is used.

6. Process according to claim 5, characterized in that sludge having a solids content of from 10% to 50% by weight, with the remainder water, is used.

7. Process according to claim 4 or 5, characterized in that a weight ratio of hydraulic mortar to sludge solids of from 30:1 to 0.5:1 is used.

8. Process according to claim 7, characterized in that said weight ratio is from 10:1 to 1:1.

9. Process according to claim 4 or 6, characterized in that, in the milling operation, the specific surface area of the solids, especially of the hydraulic mortar, is increased by 50% and more.

10. Process according to claim 9, characterized in that the specific surface area of the solids is increased by 90% and more.

11. Process according to claim 10, characterized in that the specific surface area of the solids is increased by 150% and more.

12. Process according to claim 4 or 1, characterized in that the milling operation is carried out in such a manner that more solid particles, especially the hydraulic mortar particles, pass through a particular sieve size after said milling, than before said milling.

* * * * *